US012006195B2

(12) United States Patent
Lemke

(10) Patent No.: US 12,006,195 B2
(45) Date of Patent: Jun. 11, 2024

(54) REACH TRUCK HAVING A COUNTERWEIGHT

(71) Applicant: Jungheinrich Aktiengesellschaft, Hamburg (DE)

(72) Inventor: Frank Lemke, Kaltenkirchen (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 1146 days.

(21) Appl. No.: 16/255,171

(22) Filed: Jan. 23, 2019

(65) Prior Publication Data

US 2019/0225469 A1 Jul. 25, 2019

(30) Foreign Application Priority Data

Jan. 24, 2018 (DE) ..................... 10 2018 101 537.2

(51) Int. Cl.

*B66F 9/075* (2006.01)
*B66F 9/07* (2006.01)
*B66F 9/10* (2006.01)

(52) U.S. Cl.

CPC ............ *B66F 9/07554* (2013.01); *B66F 9/07* (2013.01); *B66F 9/07568* (2013.01); *B66F 9/0759* (2013.01); *B66F 9/10* (2013.01)

(58) Field of Classification Search

CPC ...... B66F 9/07554; B66F 9/07; B66F 9/0759; B66F 9/07568; B66F 9/10

See application file for complete search history.

(56) References Cited

U.S. PATENT DOCUMENTS 4,280,784 A 7/1981 Ramacciotti
5,137,297 A * 8/1992 Walker ..................... B60S 9/10 280/475

(Continued)

FOREIGN PATENT DOCUMENTS

CN 105883682 A * 8/2016 .......... B66F 9/07568
DE 10312432 A1 4/2003

(Continued)

OTHER PUBLICATIONS

Industrial Truck With a Frame, Machine Translation of DE 10312432 A1, Dec. 4, 2003 (Year: 2003).*

(Continued)

*Primary Examiner* — Michael R Mansen
*Assistant Examiner* — Michelle M Lantrip
(74) *Attorney, Agent, or Firm* — Barclay Damon LLP

(57) ABSTRACT

A reach truck comprises two wheel arms each coupled to a load wheel, a thrust mast positioned between the wheel arms, a drive unit comprising a steerable drive wheel, and a counterweight comprised of cast iron and positioned in a front region of the reach truck. The counterweight comprises at least one of: (a) a step positioned on a front side of the reach truck at a mid-height of the counterweight and comprising a horizontal tread having a front edge; (b) two fastening apparatuses positioned on opposite sides of an underside of the counterweight, wherein a supporting element is fastened to each of the two fastening apparatuses; and (c) a splashguard positioned on an underside of the counterweight, wherein the splashguard surrounds the steerable drive wheel forming a ring and positioned away from a lateral edge of the counterweight.

15 Claims, 5 Drawing Sheets

(56) References Cited

U.S. PATENT DOCUMENTS

| | | | | |
|---|---|---|---|---|
| 5,325,935 | A * | 7/1994 | Hirooka | B62D 7/142<br>701/50 |
| 5,806,892 | A * | 9/1998 | Colburn | B66F 9/07518<br>280/834 |
| 7,967,335 | B2 | 6/2011 | Bergmeier et al. | |
| 2004/0216299 | A1 * | 11/2004 | Kobayashi | B66F 9/07554<br>187/222 |
| 2011/0260502 | A1 | 10/2011 | Yahneer | |
| 2013/0182237 | A1 * | 7/2013 | Viereck | B66F 9/0755<br>356/3 |
| 2015/0303423 | A1 * | 10/2015 | Okuyama | B66F 9/24<br>187/233 |

FOREIGN PATENT DOCUMENTS

| | | | | |
|---|---|---|---|---|
| DE | 69618699 | T3 | 3/2006 | |
| EP | 0650921 | A1 * | 5/1995 | B60K 15/063 |
| EP | 2439166 | A1 | 4/2012 | |
| EP | 2674387 | A1 * | 12/2013 | B66F 9/07568 |
| GB | 2347132 | A | 8/2000 | |
| GB | 2387366 | A * | 10/2003 | B66F 9/07545 |
| JP | H0986894 | A * | 3/1997 | |
| JP | 2001151487 | A * | 6/2001 | |
| JP | 2011006192 | A | 1/2011 | |
| WO | WO-2014083658 | A1 * | 6/2014 | B60K 15/063 |

OTHER PUBLICATIONS

DE Application 102018101537.2 filed Jan. 24, 2018, Search Report dated Jan. 16, 2019, 8 pages.

EP Application 19152180.6 filed Jan. 16, 2019, Search Report dated Jun. 27, 2019 (10 pages).

CN Application 201910065480.2, Office Action dated Nov. 23, 2021 (7 pages).

CN Application 201910065480.2, English Translation of Office Action dated Nov. 23, 2021 (5 pages).

EP 19152180; filed Jan. 6, 2019; EP Examination Report dated Oct. 27, 2022 (6 pages).

* cited by examiner

REACH TRUCK HAVING A COUNTERWEIGHT

CROSS REFERENCE TO RELATED INVENTION

This application is based upon and claims priority to, under relevant sections of 35 U.S.C. § 119, German Patent Application No. 10 2018 101 537.2, filed Jan. 24, 2018, the entire contents of which are hereby incorporated by reference.

BACKGROUND

The invention relates to a reach truck having a counterweight. The reach truck has two wheel arms, between which a thrust mast is arranged, a drive unit and a counterweight made of cast iron, which is arranged in a front region of the reach truck.

It is standard practice to use counterweights in fork-lift trucks to compensate for the tilting moments exerted by a received load. However, unlike counterbalanced lift trucks, reach trucks of the conventional design do not require a counterweight. A satisfactory weight distribution can already be achieved in the case of electrically driven vehicles by a suitable arrangement in particular of the vehicle battery. This is in particular the case when using conventional, heavy lead acid batteries.

A fork-lift truck having a counterweight, which is not configured as a reach truck, has become known from the printed publication DE 696 18 699 T2, in which the fork-lift truck counterweight is configured as a cast product and, in addition to its function as a counterweight, at the same time serves as a support for a drive unit and a steering motor.

BRIEF SUMMARY OF THE INVENTION

Starting from this, it is the object of the invention to provide a reach truck which has a particularly compact construction and which is simple to produce.

In an embodiment, a reach truck comprises two wheel arms, at the rear ends of each of which a load wheel is arranged, a thrust mast arranged between the wheel arms. A drive unit having a steerable drive wheel and a counterweight made of cast iron, which is arranged in a front region of the reach truck. The counterweight comprises at least one of the three following elements: (a) a step which is arranged at a mid-height of the counterweight on a front side of the reach truck and which has a horizontal tread having a front edge; (b) two fastening apparatuses arranged on an underside of the counterweight and on opposite sides of the counterweight, to each of which a supporting element of the reach truck is fastened; and (c) a splashguard arranged on an underside of the counterweight, said splashguard surrounding the steerable drive wheel in the form of a ring and positioned away from a lateral edge of the counterweight.

In each of the three variants, the invention achieves the indicated object in that a counterweight integrated into the reach truck is provided with a particular shape, so that it performs a function which is usually assigned to a vehicle frame or an attachment part. This means a structural simplification. At the same time, this approach makes it possible to utilize, in the best possible way, the available installation space which is extremely tight in reach trucks, because the vehicle length is kept as short as possible, a feature which is constantly striven for. As mentioned in the introduction, it is generally possible to dispense with a counterweight in the conventional design of reach truck. The inventors have, however, realized that using a counterweight which is configured in accordance with at least one of the indicated variants is on the whole advantageous. This applies in particular when deploying newer battery technologies, for example lithium-ion batteries which, due to their lower weight, can render additional measures necessary for an optimum weight distribution. In particular, in this case, a counterweight can also make a major contribution to an optimum weight distribution in the case of reach trucks.

The step is arranged at a mid-height of the counterweight on a front side of the reach truck. The term 'front side' means the side of the vehicle facing away from the thrust mast and the load-carrying means thereof. The mid-height is arranged between a lower and an upper end of the counterweight, in particular approximately at half the height between a ground, on which the reach truck is situated, and a floor of a driver's cab. The mid-height is preferably located in the range of 15 cm to 35 cm above the ground on which the reach truck is situated. The step consequently makes it possible for a driver to climb into the driver's cab in a particularly convenient manner. The step can be provided with a slip-inhibitory insert, in particular made of plastic and/or with ribs. The insert can extend over the entire tread. It can be screwed to the counterweight, in particular with the aid of fastening bores in the counterweight, which are arranged in the tread.

The supporting elements of the reach truck, which are fastened to the two fastening apparatuses arranged on the underside of the counterweight prevent the vehicle from tipping over, in that they support themselves on the ground as of a specific inclination of the vehicle. Due to their arrangement close to the ground, the supporting elements, which are also occasionally referred to as support mushrooms, are highly loaded components which can in particular be exposed to extreme impact loads in the case of uneven road surfaces or obstacles. They are therefore subject to a certain amount of wear and have to be fastened extremely robustly. The integration of suitable fastening apparatuses into the counterweight represents a particularly cost-effective solution for this.

Likewise, the integration of a splashguard surrounding the drive wheel into the counterweight constitutes a particularly cost-effective solution. The splashguard surrounds the drive wheel in the form of a ring, wherein the ring can be closed or provided with an opening. At the same time, the arrangement of the splashguard at a distance from a lateral edge of the counterweight effectively demarcates a region located outside the splashguard with respect to damaging influences of the drive wheel, and in particular protects it from moisture and dirt. As a result, the region located in this installation space may possibly be utilized in order to receive even sensitive components.

In an embodiment, the counterweight is also provided with at least one of the particular explained features (a), (b), or (c). It is clear that it can also be provided with all three features or with any two of these features.

In one embodiment, the counterweight is integrated into a base frame of the reach truck, wherein the base frame has a welded assembly having the two wheel arms and the counterweight is connected to the welded assembly. In this configuration, the counterweight consequently forms an integral part of the vehicle base frame and in particular contributes to the torsional rigidity thereof. The connection between the welded assembly and the counterweight can in particular be established by a screw connection.

In one configuration, the reach truck comprises a horizontally arranged bottom plate which is arranged at least partially below the counterweight. The bottom plate can in particular consist of steel and form a part of the indicated welded assembly. The arrangement below the counterweight makes possible a stable connection between the counterweight and the bottom plate. In particular, the bottom plate can be screwed to the counterweight.

In an embodiment, the reach truck comprises a driver's cab having a supporting structure, wherein the counterweight has a fastening apparatus, to which the supporting structure is fastened. The fastening apparatus can, for example, have a threaded bore in the counterweight, in particular within a fastening base configured on the counterweight. In this way, the driver's cab can be simply and securely fastened to the counterweight so that the counterweight fulfils a supporting function for the driver's cab.

In an embodiment, the counterweight forms a front end of the reach truck and/or extends over the entire width of the reach truck. In the case of this arrangement, the counterweight can optimally fulfil the additional functions planned in the case of the invention.

In an embodiment, a contour of the front side of the reach truck is formed at the height of the tread by the counterweight and the front edge of the tread follows this contour. In this case, the shape of the reach truck is substantially dominated on the front side by the shaping of the counterweight and the step is optimally integrated in a functional and aesthetic manner.

In an embodiment, the tread is delimited laterally and backwards by a substantially vertically arranged surface of the counterweight. The surface can thereby have multiple planar surface elements or can be configured in a curved manner. It follows the course of the edge of the tread which is distant from the front edge. Here, the term "backwards" means the direction moving away from the front edge of the step. If the front edge of the tread is located on the front side of the vehicle, the surface is therefore arranged further back in the longitudinal direction of the vehicle than the front edge. In each case, the substantially vertically arranged surface of the counterweight forms a visually attractive and robust delimitation of the step, which can be produced particularly simply.

In an embodiment, the tread, measured in the longitudinal direction of the vehicle, has a variable depth which assumes a maximum value in a middle portion of the front edge and decreases, starting from there and moving towards a side of the reach truck, on which a driver's seat is arranged, more quickly than in the opposite direction. In particular, the tread can thus have a trapezoidal or triangular basic form having corners which are rounded to a greater or lesser extent, said basic form having a larger depth further away from the driver's seat. This is ergonomically particularly advantageous. If the driver's seat is located, for example, on the right side of the vehicle, when viewed in the direction of the load-carrying means, the driver can particularly easily place his left foot obliquely on the tread in a slightly lateral position and climb into the driver's cab. The tread is of sufficient size for the driver to stand on it safely, without taking up too much installation space unnecessarily.

In an embodiment, the fastening apparatus for the supporting elements have fastening bases which protrude from an underside of the counterweight. The supporting elements can be fastened particularly robustly to such fastening bases. At the same time, the fastening bases can bridge a part of the height between the underside of the counterweight and the desired ground clearance.

In an embodiment, the fastening bases project downwards beyond a bottom plate of the reach truck. As a result, the fastening bases offer an optimum fastening possibility for the supporting elements.

In an embodiment, the supporting elements each have a receptacle which is positively positioned onto a fastening base. This design leads to a particularly robust anchoring of the supporting elements. In particular, lateral impacts can be absorbed without damage. The supporting elements can additionally be screwed to the fastening bases.

In an embodiment, the counterweight has a skirt which is arranged on the lateral and/or a front edge of the counterweight and which extends downwards, starting from a lower surface of the counterweight, wherein the splashguard likewise extends downwards from the lower surface of the counterweight. In the case of this solution, the installation space located between the splashguard and the skirt is demarcated in a way which is, at the same time, robust and simple to produce. This simplifies the arrangement of further functional elements within this installation space. Such a further functional element can, for example, be a sliding cylinder for the mast section which is wholly or partially arranged in the indicated installation space.

In an embodiment, the splashguard and the skirt extend downwards right to the bottom plate. As a result, the indicated installation space can also be robustly terminated downwards, providing additional protection.

In an embodiment, the splashguard has a forward-facing opening which is sealed by a drive wheel cover fastened to the counterweight. If a skirt is configured at the front edge of the counterweight, this can likewise have an opening in the region of the opening of the splashguard. In particular, the skirt can join the opening in the splashguard from both sides and consequently, as it were, continue the splashguard towards both sides. In each case, the forward-facing opening makes it possible to simply check and, if necessary, maintain and/or change the drive wheel. The fastening of the drive wheel cover to the counterweight can have a screwed connection. The counterweight can have one or more contact surface(s) adjacent to the drive wheel cover, on which the drive wheel cover rests. In particular, two such contact surfaces can be arranged behind the drive wheel cover on both sides of the opening. The contact surfaces form a fixed stop for the drive wheel cover, which withstands the impact loads which frequently occur in this region.

In an embodiment, the drive wheel cover is produced from cast iron. In particular, this selection of material produces a coherent design image.

BRIEF DESCRIPTION OF THE DRAWINGS

The invention is explained in greater detail below with reference to one exemplary embodiment which is represented in figures, wherein.

DETAILED DESCRIPTION OF THE INVENTION

Figure 1:
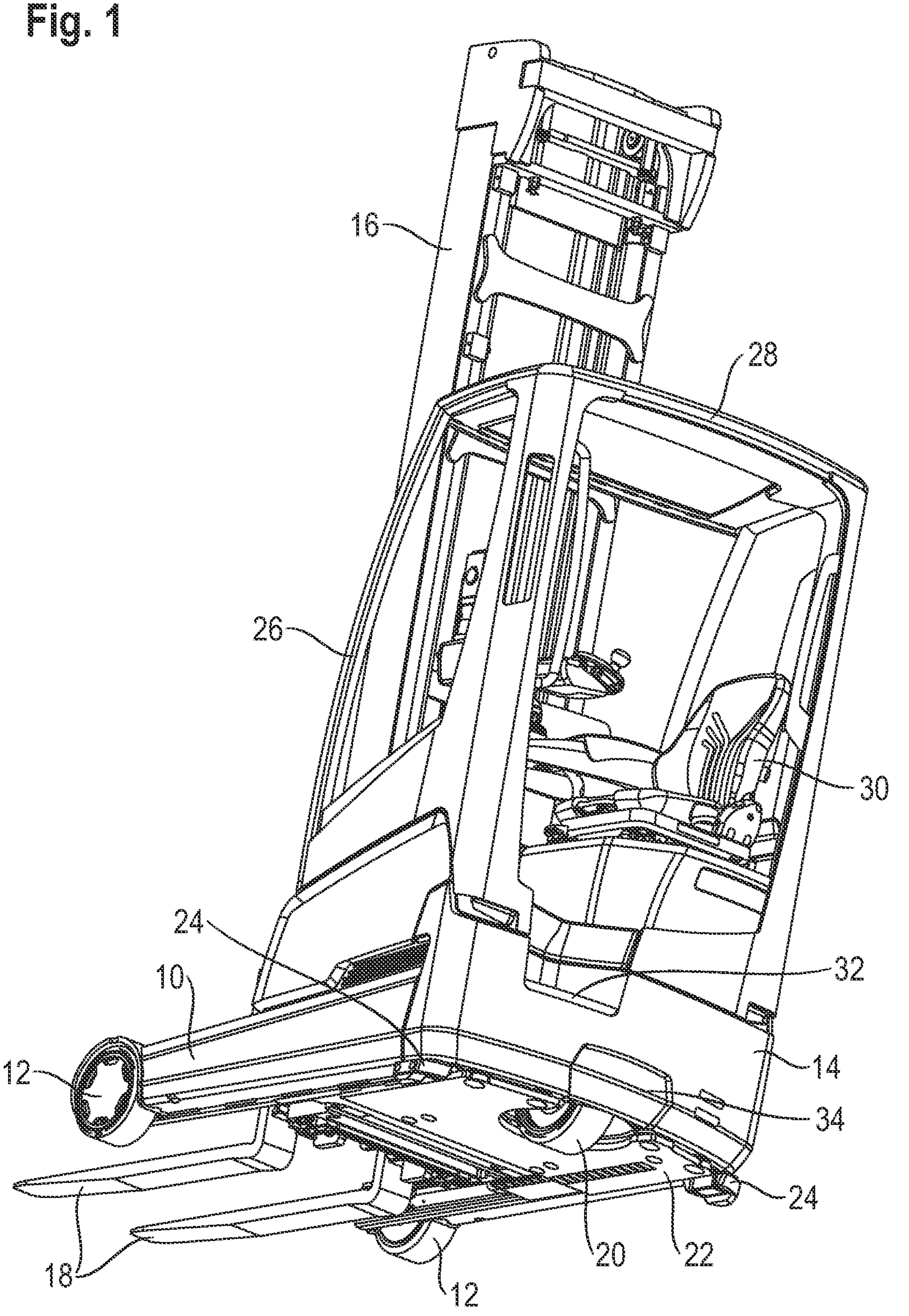
FIG. 1 illustrates a front a perspective view of an embodiment of a reach truck.

The reach truck from FIG. 1 has two wheel arms 10, at the rear ends of each of which a load wheel 12 is arranged. A counterweight 14, which substantially extends over the entire width of the vehicle and forms a front end of the reach truck, is located in a front region of the vehicle, at the front end of the wheel arms 10. It consists of cast iron, in particular spheroidal graphite cast iron, that is to say cast iron with spheroidal graphite, which is particularly easy to work.

A thrust mast 16, which is displaceable in the longitudinal direction of the vehicle, is arranged between the two wheel arms 10. A load-carrying means having two load forks 18 is fastened to the thrust mast 16.

The reach truck is electrically driven and has a drive unit having a steerable drive wheel 20. On the underside of the reach truck, a baseplate 22 made of steel is visible, which is arranged below the counterweight 14. Two supporting elements 24 arranged on both sides of the counterweight 14 on the underside thereof project downwards beyond the baseplate 22.

A driver's cab 26 having a driver's canopy 28 and a driver's seat 30 arranged transversely to the longitudinal direction of the vehicle on a right side of the driver's cab 26 are located above the counterweight 14. At the front end of the vehicle, a step 32 configured in the counterweight 14 can be seen. Likewise, a drive wheel cover 34, which is arranged centrally on the front side of the vehicle, is easily visible, said drive wheel cover like the counterweight 14 being made of cast iron.

Figure 2:
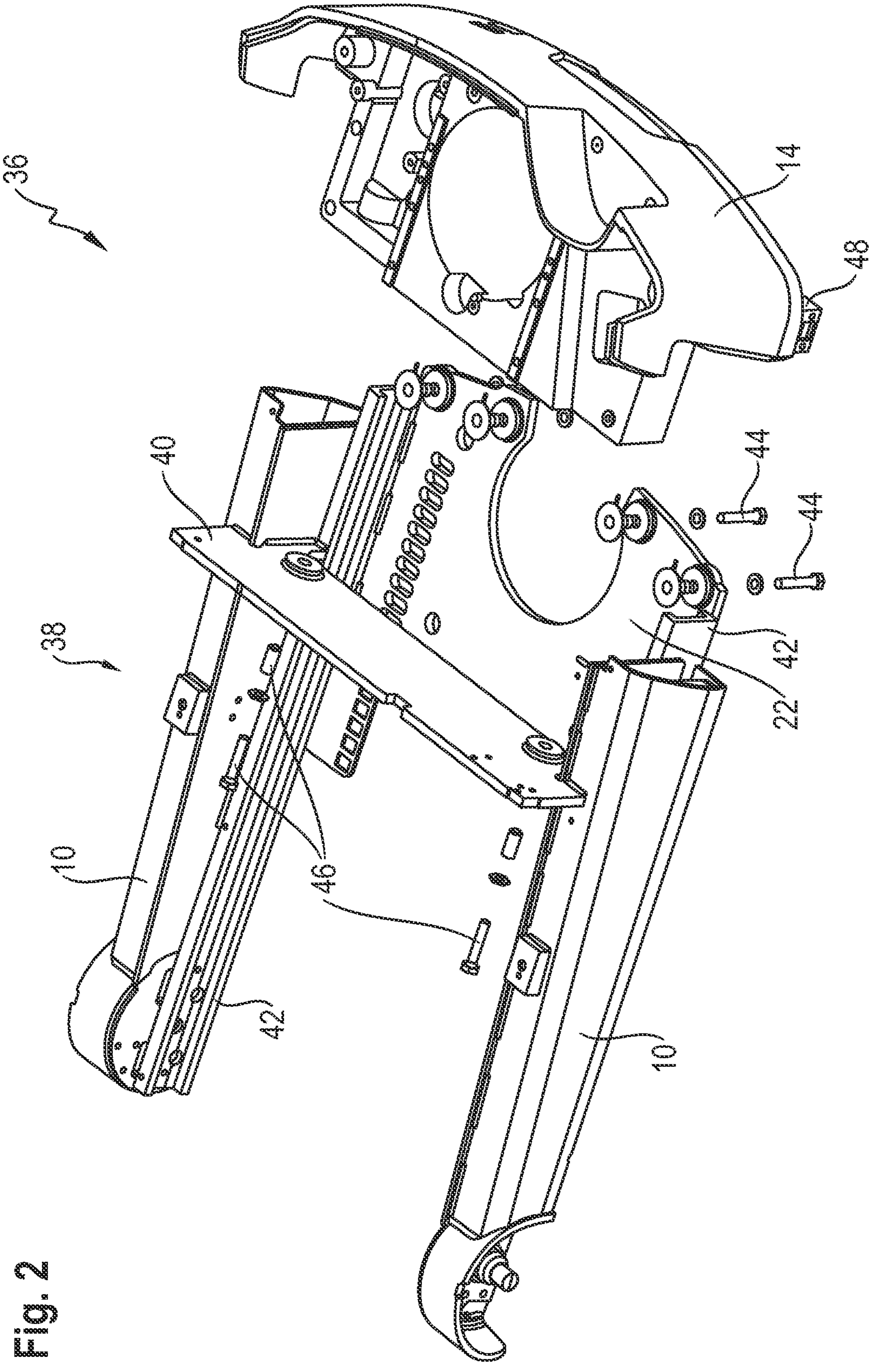
FIG. 2 illustrates an exploded view of an embodiment of a base frame of the reach truck from FIG. 1.

The construction of a base frame 36 of the reach truck, said base frame enclosing the counterweight 14, is represented in FIG. 2. The two wheel arms 10 which each have a receptacle for a load wheel 12 can be seen there. The wheel arms 10 are part of a welded assembly 38 which, beyond the wheel arms 10, comprises a crossmember 40 and the horizontally arranged bottom plate 22. The crossmember 40 is a vertically arranged steel plate. A guide rail 42 for the thrust mast 16 is shown on each of the inner sides of the wheel arms 10.

The counterweight 14 and the welded assembly 38 are screwed to one another, and indeed by means of four vertically arranged screwed connections 44 between the bottom plate 22 and the counterweight 14 as well as two horizontally arranged screwed connections 46 between the crossmember 40 and the counterweight 14. On two opposite sides of the counterweight 14 and on the underside thereof, there are located two fastening apparatuses 48 which project downwards beyond the bottom plate 22, which are each configured to fasten one of the supporting elements 24.

Figure 3:
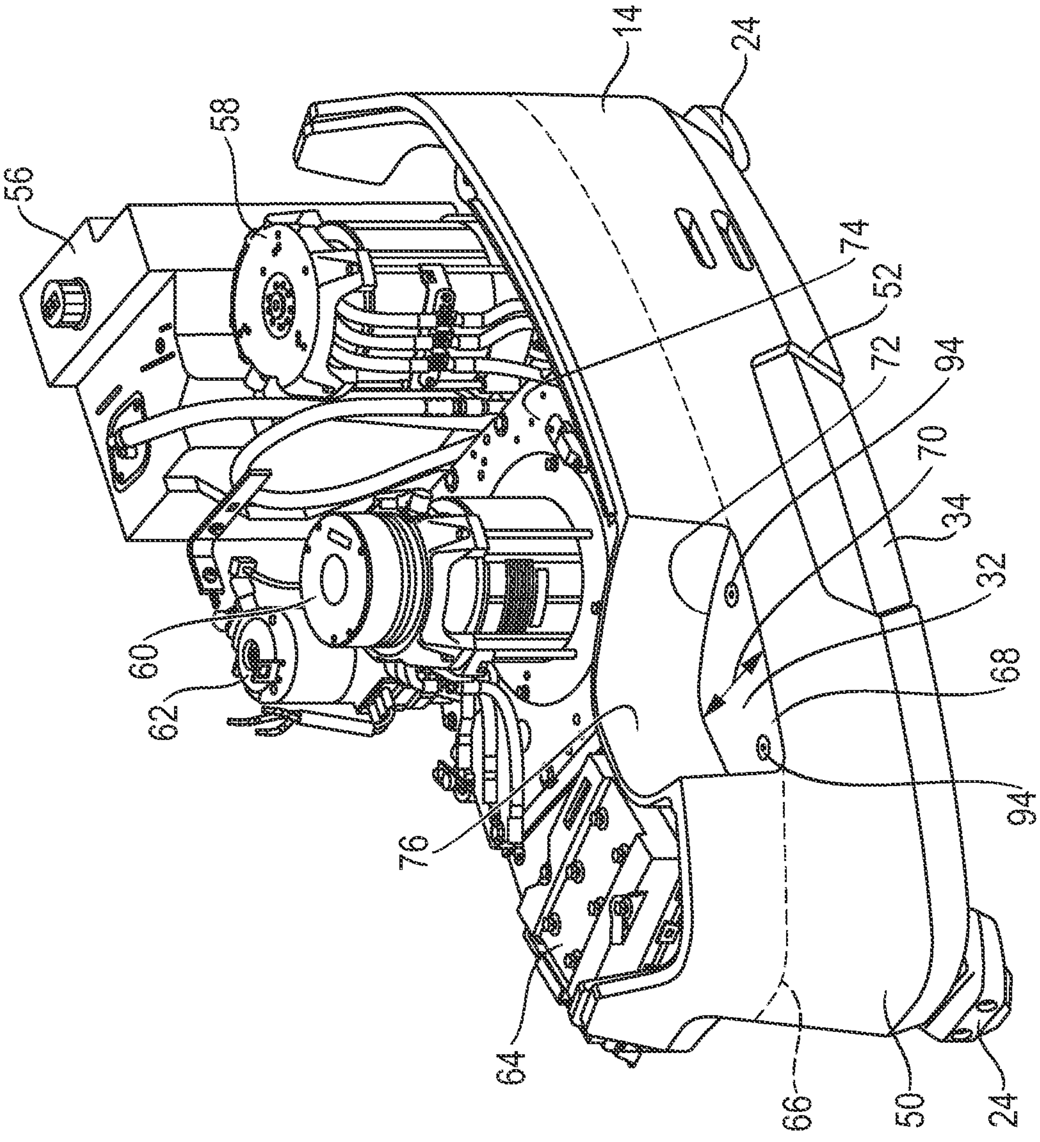
FIG. 3 illustrates a front perspective view of an embodiment of a counterweight of the reach truck from FIG. 1 having some vehicle components fastened thereto.

This is clearly visible in FIG. 3, in which the two supporting elements 24 are mounted on the counterweight 14. Likewise, it can be seen there that the counterweight 14 has on the underside a skirt 50 which reaches far downwards, which is located circumferentially at the lateral edges and at the front edge of the counterweight 14. In the center of the front edge, it has an opening 52, at the lateral edges of which it merges with a splashguard 54 (see FIG. 4). This opening 52 is sealed by the drive wheel cover 34.

Furthermore, it can be inferred from FIG. 3 that the counterweight 14 serves as a support for further vehicle components. These include a hydraulic tank 56, a hydraulic motor 58, a drive motor 60, a steering motor 62 and an electronic control system 64. All of these components are firmly connected to the counterweight 14 with the aid of special fastening apparatus configured on the counterweight 14, generally in the form of threaded bores. The drive motor 60 and the steering motor 62 are mounted on a drive unit baseplate 74 which is screwed to the counterweight 14.

The dashed line represented in FIG. 3 illustrates a contour 66 of the front side of the vehicle at the height of the step 32. This contour 66 is formed by the counterweight 14. A front edge 68 of the step 32 follows this contour 66. A depth 70 of the tread, which is drawn into the tread of the step 32 as a double arrow and measured in the longitudinal direction of the vehicle, has a maximum value approximately at the position of the double arrow, i.e. in a middle portion of the front edge 68. The depth 70 decreases, moving from this middle portion in the direction of the driver's seat 30, which is arranged approximately above the hydraulic tank 56, more quickly than in the opposite direction. The tread is accordingly approximately trapezoidal, wherein the front edge 68 of the step 32 forms the base of the trapezium and the angle between the front edge 68 and the right limb 72 of the trapezium pointing towards the driver's seat is smaller than the angle between the front edge 68 and the left limb of the trapezium, which is further away from the driver's seat. The step 32 is delimited backwards and on both sides by a substantially vertically arranged, curved surface 76 which is formed by the counterweight 14.

Moreover, two fastening bores 94 arranged in the tread can be seen in FIG. 3. These are intended for a screwed fastening of a slip-resistant plastic insert having ribs, which is not shown.

Figure 4:
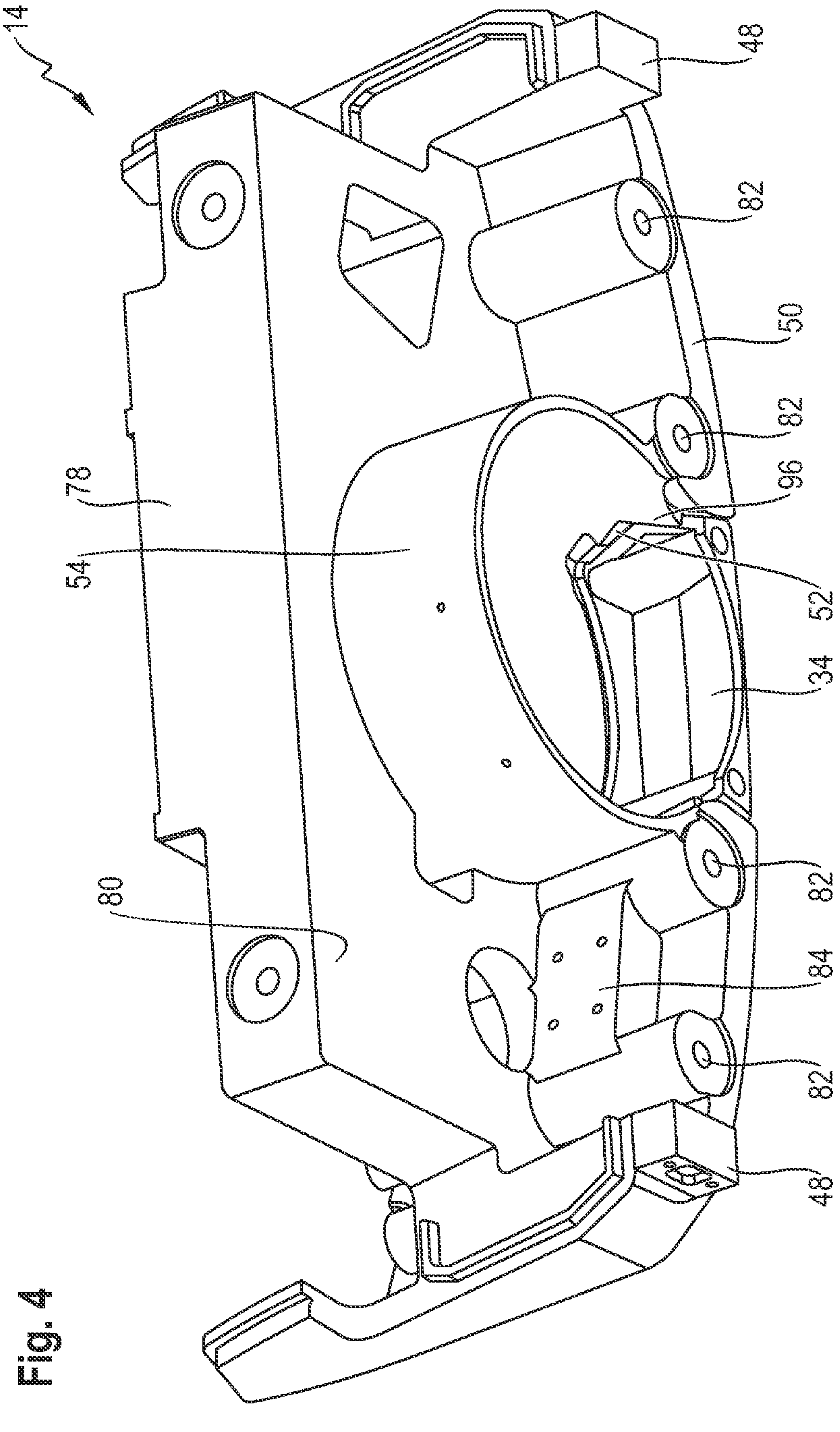
FIG. 4 illustrates a bottom perspective view of the counterweight from FIG. 3.

FIG. 4 shows the counterweight 14 in a view obliquely from behind/below. In this view, it can be seen that the counterweight 14 is delimited at its rear end by a substantially planar, vertically arranged rear surface 78 which is screwed to the crossmember 40 of the base frame 36. On the underside, the counterweight 14 has a substantially planar, lower surface 80 which is arranged at a somewhat lower height than the tread. The splashguard 54, which surrounds the drive wheel 20 in the form of a ring, extends downwards from this lower surface 80. In addition, the skirt 50 likewise extends downwards from the lower surface 80. The skirt 50 and splashguard 54 end at the bottom plate 22 (FIG. 2). The two sides of the skirt 50 and the splashguard 54 merge with one another on the two sides of the opening 52 in the skirt 50.

The fastening of the drive wheel cover 34 (FIG. 3) to the counterweight 14 has a screwed connection which is not shown. One of two webs 96 located on both sides of the opening 52, configured on the counterweight 14, arranged behind the drive wheel cover 34 can be better seen. These webs 96 each form a stable contact surface for the drive wheel cover 34.

In order to screw the counterweight 14 to the bottom plate 22, four threaded bores 82 are provided in the counterweight 14. The two fastening apparatuses 48 for the supporting elements 24 can also be easily seen. These are located on both sides of the counterweight 14 and each have a vertically arranged fastening base, which is rectangular in cross section, onto which a supporting element 24 having a corresponding receptacle is positively positioned.

Further functional elements of the reach truck can be arranged in the installation space arranged below the lower surface 80, which is delimited forwardly by the skirt 50, towards the sides, by the lateral edges of the skirt 50 as well as by the inner sides adjacent thereto of the wheel arms 10 as well as by the splashguard 54 and downwards by the bottom plate 22. To this end, FIG. 4 shows a fastening surface 84 having four fastening bores for fastening a push cylinder (not shown) for the thrust mast 16 (FIG. 1).

Figure 5:
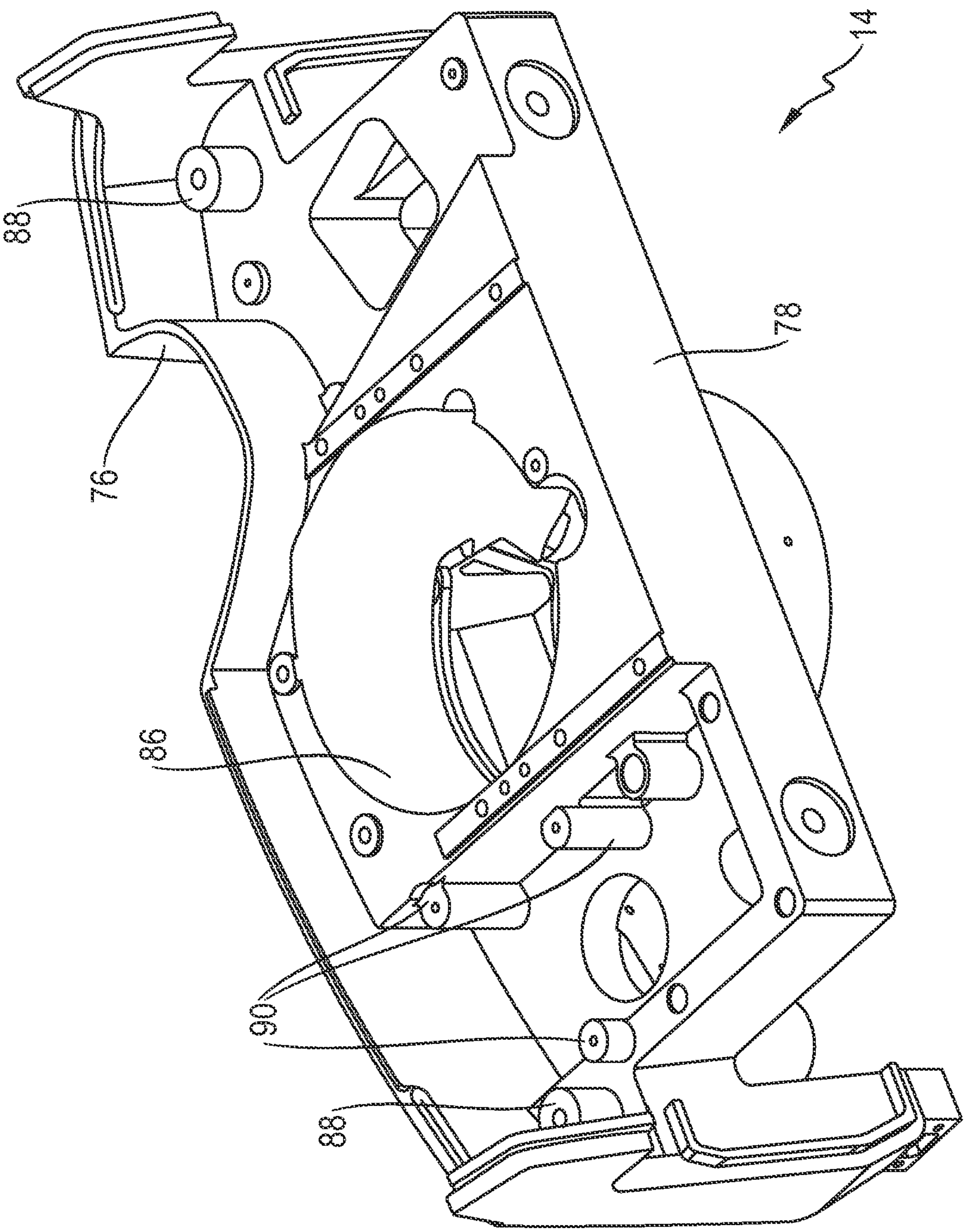
FIG. 5 illustrates a top perspective view of the counterweight from FIG. 3.

FIG. 5 shows that the counterweight 14 above the lower surface 80 has a large-for-mat through-opening 86 which receives the drive unit having a part of the drive motor 60 (FIG. 3) or respectively of an adjoining transmission, together with the drive wheel support. On both sides of the through-opening 86 there is a plurality of fastening bores arranged in two rows for fastening the drive unit baseplate 74.

In addition, the counterweight 14 has two fastening bases 88 arranged on both sides close to its front end, to which fastening bases a supporting structure of the driver's cab 26 is fastened. These fastening bases 88 are configured as cylindrical threaded domes having a central threaded bore. Three further fastening bases 90 are provided for fastening the hydraulic motor 58.

LIST OF REFERENCE NUMERALS

10 Wheel arms
12 Load wheel
14 Counterweight
16 Thrust mast
18 Load fork
20 Drive wheel
22 Bottom plate
24 Supporting element
26 Driver's cab
28 Driver's canopy
30 Driver's seat
32 Step
34 Drive wheel cover
36 Base frame
38 Welded assembly
40 Crossmember
42 Guide rail
44 Vertical screw connection
46 Horizontal screw connection
48 Fastening apparatus
50 Skirt
52 Opening
54 Splashguard
56 Hydraulic tank
58 Hydraulic motor
60 Drive motor
62 Steering motor
64 Electronic control system
66 Contour of front side
68 Front edge
70 Depth
72 Limb
74 Drive unit baseplate
76 Vertical surface
78 Rear surface
80 Lower surface
82 Threaded bore
84 Fastening surface
86 Opening
88 Fastening base
90 Fastening base
94 Fastening bore
96 Web

The invention claimed is:

1. A reach truck comprising:

two wheel arms each coupled to a load wheel;

a thrust mast positioned between the wheel arms and moveable in a longitudinal direction relative to the two wheel arms;

a drive unit comprising a steerable drive wheel; and a counterweight comprised of cast iron and positioned in a front region of the reach truck, wherein the counterweight comprises, two fastening apparatuses formed on opposite sides of an underside of the counterweight, a supporting element fastened to each of the two fastening apparatuses, wherein the supporting elements are adapted to support themselves on a ground at a specific inclination of the reach truck in order to prevent the reach truck from tipping over, and a base frame comprising a welded assembly that includes, the two wheel arms, and a horizontally arranged bottom plate, wherein the counterweight is connected to the welded assembly and the horizontally arranged bottom plate of the welded assembly is positioned at least partially below the counterweight.

2. The reach truck according to claim 1, further comprising a driver cab comprising a supporting structure, wherein the counterweight comprises a fastening means configured to fasten to the supporting structure.

3. The reach truck according to claim 1, wherein the counterweight forms a front end of the reach truck.

4. The reach truck according to claim 3, wherein the counterweight extends over a width of the reach truck.

5. The reach truck according to claim 1, wherein the counterweight forms a contour of a front side of the reach truck at a height of a tread and a front edge of the tread follows the contour.

6. The reach truck according to claim 5, wherein the tread is delimited laterally and backwards by a substantially vertically arranged surface of the counterweight.

7. The reach truck according to claim 6, wherein the tread measured in a longitudinal direction of the reach truck has a variable depth having a maximum value in a middle portion of the front edge and decreasing more quickly towards a side of the reach truck on which a driver seat is positioned than in an opposite direction.

8. The reach truck according to claim 1, wherein the counterweight further comprises a skirt positioned on at least one of a lateral edge and a front edge of the counterweight, and wherein the skirt and splashguard extend downwards from a lower, substantially planar surface of the counterweight.

9. The reach truck according to claim 8, wherein the splashguard and the skirt extend downwards to a bottom plate.

10. The reach truck according to claim 9, wherein the splashguard comprises a forward-facing opening which is sealed by a drive wheel cover that is fastened to the counterweight.

11. The reach truck according to claim 10, wherein the drive wheel cover is comprised of cast iron.

12. The reach truck according to claim 1, wherein a mid-height is 15 cm to 35 cm above a surface on which the reach truck is situated.

13. The reach truck according to claim 1, wherein the counterweight comprises a step positioned on a front side of the reach truck at a mid-height of the counterweight and comprising a horizontal tread having a front edge.

14. The reach truck according to claim 1, wherein the counterweight further comprises a splashguard positioned on an underside of the counterweight, wherein the splashguard surrounds the steerable drive wheel forming a ring and positioned away from a lateral edge of the counterweight, wherein the splashguard extends downwards from a lower, substantially planar surface of the counterweight.

15. The reach truck according to claim 1, wherein the bottom plate is comprised of steel.

* * * * *